(12) United States Patent
Daniello

(10) Patent No.: US 9,925,497 B2
(45) Date of Patent: Mar. 27, 2018

(54) CONDITION MONITORING FOR AN AIR SEPARATION MODULE

(71) Applicant: Hamilton Sundstrand Corporation, Windsor Locks, CT (US)

(72) Inventor: Robert Daniello, Florence, MA (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 238 days.

(21) Appl. No.: 14/797,966

(22) Filed: Jul. 13, 2015

(65) Prior Publication Data

US 2017/0014774 A1    Jan. 19, 2017

(51) Int. Cl.
| | | |
|---|---|---|
| *B01D 53/22* | (2006.01) | |
| *B01D 63/00* | (2006.01) | |
| *B64D 37/32* | (2006.01) | |
| *B01D 53/30* | (2006.01) | |
| *B01D 65/00* | (2006.01) | |
| *B01D 63/02* | (2006.01) | |

(52) U.S. Cl.
CPC ............ *B01D 63/00* (2013.01); *B01D 53/22* (2013.01); *B01D 53/30* (2013.01); *B01D 63/02* (2013.01); *B01D 65/00* (2013.01); *B64D 37/32* (2013.01); *B01D 2256/10* (2013.01); *B01D 2257/104* (2013.01); *B01D 2259/4575* (2013.01); *B01D 2313/20* (2013.01); *B01D 2313/90* (2013.01)

(58) Field of Classification Search
CPC .......... B01D 2259/40009; B01D 53/22; B01D 35/143; B01D 2313/20; B01D 2313/90; B01D 53/30; B01D 63/00; B01D 63/02; B01D 65/00; B64D 37/32
See application file for complete search history.

(56) References Cited

U.S. PATENT DOCUMENTS

| | | | | |
|---|---|---|---|---|
| 5,596,988 A | * | 1/1997 | Markle | ............ A61B 5/14539 204/416 |
| 5,855,772 A | * | 1/1999 | Miller | ................... B01D 29/15 210/149 |
| 5,902,379 A | | 5/1999 | Phillips et al. | |

(Continued)

FOREIGN PATENT DOCUMENTS

| | | |
|---|---|---|
| EP | 2163476 A2 | 3/2010 |
| EP | 2762222 A1 | 8/2014 |
| WO | WO2006/079782 A2 | 8/2006 |

OTHER PUBLICATIONS

Extended European Search Report for EP Application No. 16178959.9, dated Dec. 5, 2016, 8 pages.

*Primary Examiner* — Anthony Shumate
(74) *Attorney, Agent, or Firm* — Kinney & Lange, P.A.

(57) ABSTRACT

An air separation module includes a shell configured to house an air separation membrane, an inlet configured to receive supply air, an oxygen-enriched air outlet configured to exhaust oxygen from the air separation module, and a nitrogen-enriched air outlet configured to supply a stream of nitrogen-enriched air to a fuel tank of an aircraft. The air separation module also includes a condition monitoring sensor integral with the air separation module and configured to measure at least one of a plurality of conditions; and a connector integral with the air separation module and configured to join the condition monitoring sensor with an electrical system of the aircraft.

19 Claims, 2 Drawing Sheets

(56) References Cited

U.S. PATENT DOCUMENTS

| | | | | |
|---|---|---|---|---|
| 5,996,397 A * | 12/1999 | Mettes | ............... | B01D 53/22 |
| | | | | 73/24.04 |
| 7,081,153 B2 | 7/2006 | Leigh et al. | | |
| 7,189,352 B2 * | 3/2007 | Carpenter | ............ | A61M 1/3627 |
| | | | | 210/645 |
| 7,204,958 B2 * | 4/2007 | Olsen | ................ | A61M 1/101 |
| | | | | 210/645 |
| 7,574,894 B2 | 8/2009 | Parker et al. | | |
| 2002/0074277 A1 * | 6/2002 | Thomassen | ............ | B01D 29/52 |
| | | | | 210/323.2 |
| 2004/0220538 A1 * | 11/2004 | Panopoulos | ............ | A61F 13/42 |
| | | | | 604/361 |
| 2005/0004476 A1 * | 1/2005 | Payvar | .................... | A61B 5/01 |
| | | | | 600/481 |
| 2008/0060523 A1 | 3/2008 | Tom et al. | | |
| 2010/0100061 A1 * | 4/2010 | Odland | ............... | A61M 1/0084 |
| | | | | 604/313 |
| 2011/0077477 A1 * | 3/2011 | Romey | ............... | A61B 5/14532 |
| | | | | 600/309 |
| 2011/0204089 A1 * | 8/2011 | Shettle | ................ | B67D 1/0468 |
| | | | | 222/61 |
| 2011/0268153 A1 * | 11/2011 | He | ....................... | A47J 37/108 |
| | | | | 374/179 |
| 2014/0010262 A1 * | 1/2014 | Nakamura | ............ | G01J 5/0875 |
| | | | | 374/121 |
| 2014/0067137 A1 * | 3/2014 | Amelio | ................. | H03K 17/00 |
| | | | | 700/286 |
| 2014/0234949 A1 * | 8/2014 | Wasson | .............. | G01N 35/1065 |
| | | | | 435/287.2 |
| 2014/0242710 A1 * | 8/2014 | Suri | ................... | A61L 33/0023 |
| | | | | 436/95 |
| 2015/0040659 A1 * | 2/2015 | Yu | ......................... | G01F 23/263 |
| | | | | 73/290 R |
| 2015/0238721 A1 * | 8/2015 | Rumph | ............. | B01D 53/0446 |
| | | | | 128/202.26 |

* cited by examiner

CONDITION MONITORING FOR AN AIR SEPARATION MODULE

BACKGROUND

The present disclosure relates generally to aircraft safety, and, more particularly, to aircraft fuel tank inerting. Specifically, the present disclosure concerns air separation modules (ASMs).

As an aircraft consumes fuel during flight, atmospheric air consisting largely of nitrogen and oxygen enters its fuel tanks. The presence of atmospheric air in the fuel tanks increases the risk of combustion as oxygen mixes with fuel vapors. In order to prevent combustion, the void left by consumed fuel is filled with an inert gas, such as nitrogen. A nitrogen generation system (NGS) includes an ASM, which produces nitrogen-enriched air (NEA) for inerting the fuel tanks. Ideally, the concentration of oxygen in the fuel tanks is less than twelve percent. The presence of NEA substantially reduces the risk of combustion.

A membrane-based ASM is commonly used to produce NEA and includes a polymeric membrane for separating atmospheric air into NEA and oxygen-enriched air (OEA). Over time, the tubular membranes within a membrane-based ASM canister degrade. Typical ASM canisters are formed from aluminum. While several downstream sensors typically measure the conditions and health of the canister, state of the art ASM canisters have no integral sensing capabilities.

SUMMARY

In one embodiment, an air separation module includes a shell configured to house an air separation membrane, an inlet configured to receive supply air, an oxygen-enriched air outlet configured to exhaust oxygen from the air separation module, and a nitrogen-enriched air outlet configured to supply a stream of nitrogen-enriched air to a fuel tank of an aircraft. The air separation module also includes a condition monitoring sensor integral with the air separation module and configured to measure at least one of a plurality of conditions; and a connector integral with the air separation module and configured to join the condition monitoring sensor with an electrical system of the aircraft.

In another embodiment, a method of assembling an air separation module includes providing a shell, positioning a condition monitoring sensor within the shell such that the condition monitoring sensor is integral with the air separation module, and joining the condition monitoring sensor with an electrical system of an aircraft.

DETAILED DESCRIPTION

The present disclosure relates to an air separation module (ASM) for generating nitrogen-enriched air (NEA). The air separation module includes integrated instrumentation for monitoring the health of the ASM. By incorporating sensors within the shell of the ASM, the effectiveness of the ASM can be more accurately measured without the sensor drift that typically occurs with downstream sensors. The air separation module of the present disclosure improves accuracy of condition monitoring within an ASM to improve not only control of the system during operation, but also prediction of when the ASM membrane has reached the end of its life. While the present disclosure is described in the context of aircraft fuel tank inerting, it is to be understood the following embodiments could be employed in any environment requiring more accurate monitoring of a system.

Figure 1:
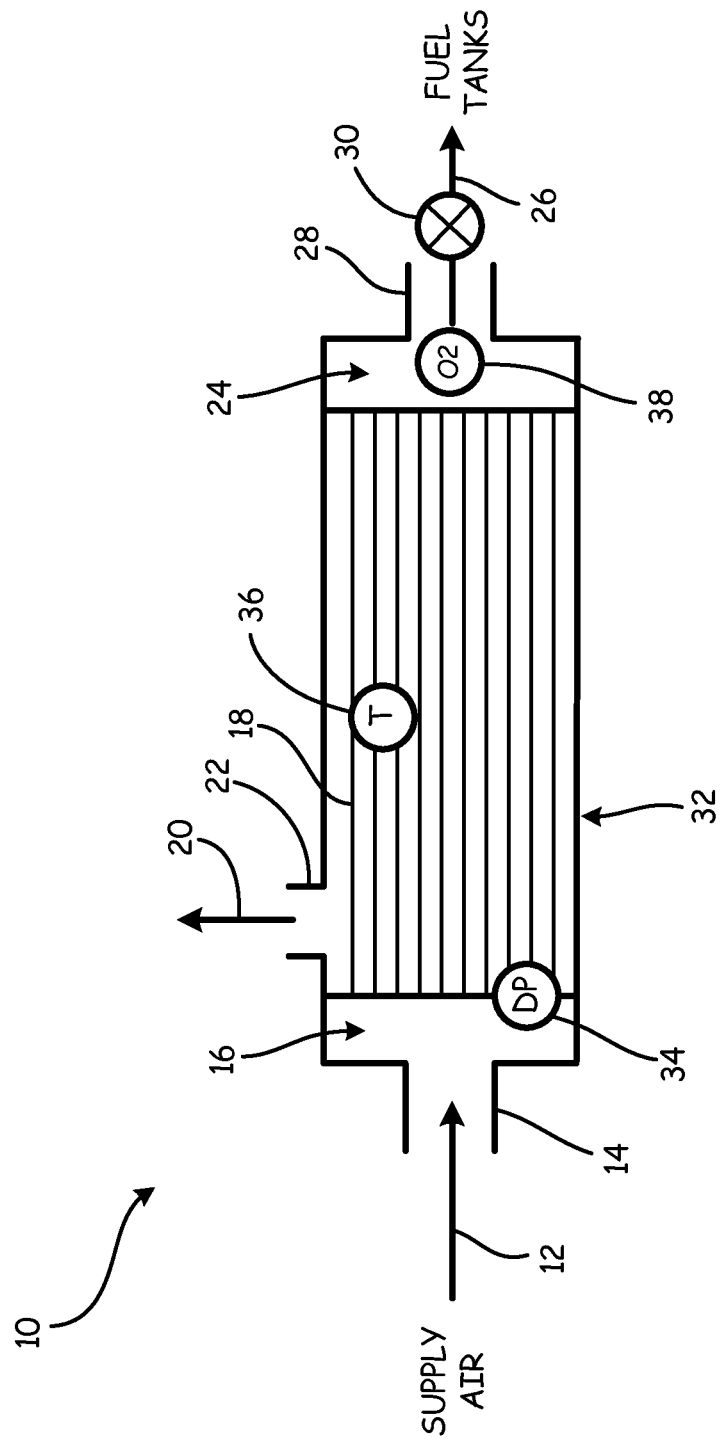
FIG. 1 is a simplified cross-sectional view of an air separation module including a plurality of condition monitoring sensors.

FIG. 1 is a simplified cross-sectional view of ASM 10, which includes a plurality of condition monitoring sensors. ASM 10 includes supply air input 12, supply air inlet 14, intake plenum 16, hollow fiber membranes 18, oxygen-enriched air (OEA) output 20, OEA outlet 22, outlet plenum 24, NEA output 26, NEA outlet 28, backpressure valve 30, shell 32, differential pressure sensor 34, temperature sensor 36, and oxygen sensor 38.

ASM 10 receives supply air through supply air inlet 14. Supply air is delivered into intake plenum 16 and through hollow fiber membranes 18. Oxygen permeates across hollow fiber membranes 18, and OEA output 20 is exhausted from ASM 10 via OEA outlet 22. NEA travels through hollow fiber membranes 18 to outlet plenum 24, and NEA output 26 travels to a fuel tank or other container that requires inerting (not shown) via NEA outlet 28. Backpressure valve 30 is positioned between NEA outlet 28 and the fuel tanks or containers to maintain pressure in the system and control NEA flow. Shell 32 surrounds and encloses hollow fiber membranes 18 of ASM 10. Differential pressure sensor 34, temperature sensor 36, and oxygen sensor 38 are integral with ASM 10 such that ASM 10 and its condition monitoring components are enclosed in a discrete unit.

Supply air flowing through supply air input 12 is typically bleed air from a compressor section of a gas turbine engine (not shown). Bleed air exiting the compressor section can be at a temperature ranging from about 100° F. (37° C.) to 450° F. (232° C.). In some embodiments, bleed air is cooled by a heat exchanger (not shown) prior to delivery to ASM 10. Temperature-conditioned supply air exiting the heat exchanger can be at a temperature ranging from about 60° F. (15° C.) to 200° F. (93° C.). The temperature-conditioned supply air is then delivered to ASM 10 via supply air input 12.

Bleed air is typically atmospheric air. Atmospheric air is composed of about 78 percent nitrogen and 21 percent oxygen, with trace amounts of other gases. ASM 10 includes hollow fiber membranes 18, which are permeable to oxygen. The partial pressure of oxygen inside shell 32 is less than the partial pressure of oxygen inside hollow fiber membranes 18. In some embodiments, this is due to oxygen being dumped overboard after passing through OEA outlet 22. As a result, oxygen permeates across hollow fiber membranes 18 and exits ASM 10 through OEA outlet 22. Nitrogen is retained in the supply air within hollow fiber membranes 18, and exits ASM 10 through NEA outlet 28. The concentration of oxygen in the NEA exiting ASM 10 is generally between about 5% and about 12%.

In the embodiment shown in FIG. 1, the air separation membrane of ASM 10 includes hollow fiber membranes 18. Hollow fiber membrane 18 can be a plurality of hollow fiber elements bundled to form parallel flow paths and subject to the same inlet pressure. In other embodiments, the air separation membrane may be any suitable membrane, such as a spiral wound membrane. In the embodiment shown in FIG. 1, multiple hollow fiber membranes 18 are included in ASM 10. In other embodiments, ASM 10 can have any number of hollow fiber membranes 18, which may be housed in any number of shells 32 including a single hollow fiber membrane in a single shell 32. The membrane of ASM 10 is typically formed from a polymer such as poly(l-trimethylsilyl-1-propyne), Teflon® (polytetrafluoroethylene), silicone rubber, poly(4-methyl-1-pentene), poly(phenylene oxide), ethyl cellulose, polyimide, polysulfone, polyaramide, tetrabromo bis polycarbonate, or combinations thereof. At a given temperature, these polymeric membrane materials have a fixed selectivity and permeability that limits the performance of the ASM. Moreover, high pressure must be maintained at intake plenum 16 relative to OEA outlet 22 and outlet plenum 24 in order for oxygen to permeate through hollow fiber membranes 18.

In order to ensure the proper operating conditions of an ASM, temperature and pressure sensors are typically installed upstream and/or downstream. In the embodiment shown in FIG. 1, differential pressure sensor 34, temperature sensor 36, and oxygen sensor 38 are integrated into ASM 10, in which shell 32 includes a carbon fiber composite. In other embodiments, shell 32 can be aluminum or any other material suitable for enclosing hollow fiber membranes 18, such as Kevlar® aramid fiber or Spectra® polyethylene fiber. In an aluminum embodiment, fittings for the lead wires and electrical connectors (not shown in FIG. 1) for differential pressure sensor 34, temperature sensor 36, and oxygen sensor 38 machined into shell 32. In an aluminum embodiment, the lead wires can be dielectrics or insulated wires. In the embodiment shown in FIG. 1, differential pressure sensor 34, temperature sensor 36, and oxygen sensor 38 are incorporated into ASM 10 as ASM 10 is built, such that the condition monitoring components are integral with, or embedded in, shell 32, as shown and described in further detail in FIG. 2. In addition to pressure, temperature, and oxygen sensors, other embodiments can include any number of condition monitoring sensors, including but not limited to indicators of ozone exposure and other health monitoring sensors, such as indicators of ice blockage. In this manner, sensors indicating the need for membrane replacement are integral with ASM 10 to better predict end-of-life. For example, an oxygen sensor placed downstream in OEA output 20 may not be able to accurately pinpoint the source of a problem in oxygen concentration, leading to premature or delayed removal of hollow fiber membranes 18. Specifically, nitrogen generation systems of the prior art typically include several connected ASM canisters but only a single downstream oxygen sensor. If one ASM fails, that failure may not be visible in the aggregate or would appear as a degradation of all canisters rather than being traceable to the offending unit. Integrated sensors are also able to improve control of ASM 10 during operation with more sensitive information gathering due to sensor proximity to hollow fiber membranes 18. Specifically, OEA is typically dumped from ASM 10 as quickly as possible to maintain low permeate pressure. Thus, an oxygen sensor on the OEA or shell side of ASM 10 where OEA concentration and relative concentration differences are higher can more accurately and precisely monitor a nitrogen generation system.

Figure 2:
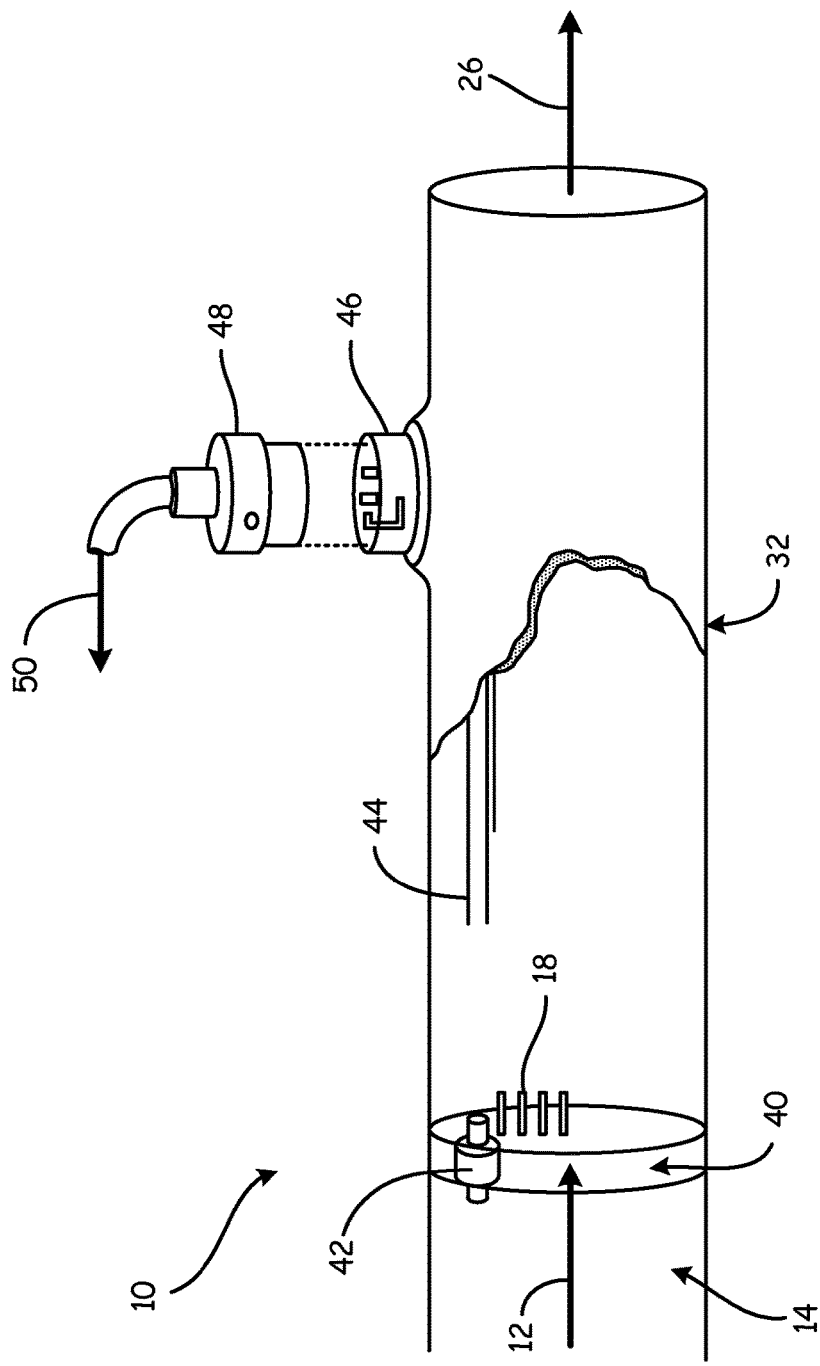
FIG. 2 is a partial cutaway perspective view of an air separation module including a plurality of condition monitoring sensors.

FIG. 2 is a partial cutaway perspective view of ASM 10 including a plurality of condition monitoring sensors. ASM 10 includes supply air input 12, hollow fiber membranes 18, NEA output 26, shell 32, end plug 40, differential pressure transducer 42, lead wires 44, ASM electrical connector 46, aircraft electrical connector 48, and sensor data output 50.

ASM 10 receives supply air input 12 through supply air inlet 14. High pressure forces supply air input 12 through hollow fiber membranes 18, where oxygen permeates across hollow fiber membranes 18 as discussed above in FIG. 1. NEA travels through hollow fiber membranes 18, and NEA output 26 travels to a fuel tank or other container that requires inerting (not shown). Differential pressure transducer 42 measures pressure across end plug 40 and is connected to ASM electrical connector 46 via lead wires 44. Aircraft electrical connector 48 is configured to fasten to ASM electrical connector 46 to transmit electric current to 46 and sensor data output to a controller (not shown) to regulate a fuel tank inerting system. In the embodiment shown in FIG. 2, connector 46 is embedded in the skin of shell 32. In other embodiments, a mounting plate for connector 46 can be embedded in the skin of shell 32. Sensor data output 50 can transmit information regarding the condition of ASM 10, such as ice-blockage, the temperature within shell 32, the differential pressure across end plug 40, and small differences in oxygen concentration in real time. These measurements help optimize control of ASM 10, diagnose problems, and accurately predict when hollow fiber membranes 18 need replacement. As discussed above, this sensor data output can more accurately predict when ASM 10 needs replacement. Alternatively, hollow fiber membranes 18 can be removed from ASM 10 and replaced when hollow fiber membranes 18 can no longer generate NEA with an oxygen concentration less than about 12%.

The embodiment shown in FIG. 2 is an example of a sensor, namely differential pressure transducer 42, integrated into ASM 10. In the embodiment shown in FIG. 2, shell 32 is formed from a composite, such as carbon fiber, Kevlar® aramid fiber, or Spectra® polyethylene fiber. Shell 32 surrounds hollow fiber membranes 18 and end plug 40 such that higher pressure is maintained at supply air inlet 14, causing oxygen in the supply air to permeate through hollow fiber membranes 18 and out of ASM 10 via OEA outlet 22 (not shown in FIG. 2). Pressure transducer 42 can be installed in end plug 40 while ASM 10 is being assembled. Lead wires 44 can be integral with the carbon fiber layers of shell 32. For example, while ASM 10 is being assembled, lead wires 44 can be embedded in the carbon fiber layers of the composite forming shell 32. ASM connector 46 can be fastened to aircraft connector 48 via a quarter-turn fastener, screw lock, or other fastener suitable for securely connecting the electrical system of ASM 10 with the electrical system of the aircraft. In this manner, pressure transducer 42 can reliably submit data to the controller (not shown) without extraneous wires and sensors.

Discussion of Possible Embodiments

The following are non-exclusive descriptions of possible embodiments of the present invention.

An air separation module according to an exemplary embodiment of this disclosure, among other possible things can include a shell configured to house an air separation membrane, an inlet configured to receive supply air, an oxygen-enriched air outlet configured to exhaust oxygen from the air separation module, and a nitrogen-enriched air outlet configured to supply a stream of nitrogen-enriched air to a fuel tank of an aircraft. The air separation module can also include a condition monitoring sensor integral with the air separation module and configured to measure at least one of a plurality of conditions; and a connector integral with the air separation module and configured to join the condition monitoring sensor with an electrical system of the aircraft.

The air separation module of the preceding paragraph can optionally include, additionally and/or alternatively, any one or more of the following features, configurations and/or additional components:

A further embodiment of the foregoing air separation module can include that the shell comprises aluminum.

A further embodiment of any of the foregoing air separation modules can include that the connector is fitted within a hole machined in the shell.

A further embodiment of any of the foregoing air separation modules can include that the shell comprises a composite.

A further embodiment of any of the foregoing air separation modules can include that the condition monitoring sensor is embedded in the composite.

A further embodiment of any of the foregoing air separation modules can include that the connector comprises a lead wire running through the composite.

A further embodiment of any of the foregoing air separation modules can include that the connector is configured to receive an electrical connector of the electrical system.

A further embodiment of any of the foregoing air separation modules can include that the connector and the electrical connector are secured by a fastener.

A further embodiment of any of the foregoing air separation modules can include that the fastener is a quarter-turn fastener or a screw lock.

A further embodiment of any of the foregoing air separation modules can include that the composite is selected from the group consisting of carbon fiber, Kevlar® aramid fiber, and Spectra® polyethylene fiber.

A further embodiment of any of the foregoing air separation modules can include that the condition monitoring sensor is integrated with an end plug of the air separation membrane.

A further embodiment of any of the foregoing air separation modules can include that the plurality of condition monitoring sensors is selected from the group consisting of pressure transducers, temperature sensors, oxygen sensors, and ozone exposure indicators.

A method of assembling an air separation module according to an exemplary embodiment of this disclosure, among other possible things can include providing a shell, positioning a condition monitoring sensor within the shell such that the condition monitoring sensor is integral with the air separation module, and joining the condition monitoring sensor with an electrical system of an aircraft.

The method of the preceding paragraph can optionally include, additionally and/or alternatively, any one or more of the following features, configurations and/or additional components:

A further embodiment of the foregoing method can include placing an air separation membrane within the shell.

A further embodiment of any of the foregoing methods can include embedding the condition monitoring sensor within an end plug of the air separation membrane.

A further embodiment of any of the foregoing methods can include installing the condition monitoring sensor within an aluminum shell.

A further embodiment of any of the foregoing methods can include machining a hole in the aluminum canister and fitting a connector within the hole, wherein the connector comprises a lead wire connecting to the condition monitoring sensor and an electrical connector of the electrical system of the aircraft via a fastener.

A further embodiment of any of the foregoing methods can include embedding the condition monitoring sensor within a carbon fiber composite.

A further embodiment of any of the foregoing methods can include running a lead wire through the carbon fiber composite to connect the condition monitoring sensor to the electrical system.

A further embodiment of any of the forgoing methods can include embedding a connector or a mounting plate for the connector within the carbon fiber composite, wherein the connector comprises a lead wire connecting the condition monitoring sensor and the electrical system of the aircraft via a fastener.

While the disclosure has been described with reference to an exemplary embodiment(s), it will be understood by those skilled in the art that various changes may be made and equivalents may be substituted for elements thereof without departing from the scope of the disclosure. In addition, many modifications may be made to adapt a particular situation or material to the teachings of the invention without departing from the essential scope thereof. Therefore, it is intended that the disclosure not be limited to the particular embodiment(s) disclosed, but that the disclosure will include all embodiments falling within the scope of the appended claims.

The invention claimed is:

1. An air separation module comprising:
a shell configured to house an air separation membrane;
an inlet configured to receive supply air;
an oxygen-enriched air outlet configured to exhaust oxygen from the air separation module;
a nitrogen-enriched air outlet configured to supply a stream of nitrogen-enriched air to a fuel tank of an aircraft;
a condition monitoring sensor integral with the air separation module and configured to measure at least one of a plurality of conditions, wherein the condition monitoring sensor is embedded in an element selected from a group consisting of the shell and an end plug of the air separation membrane; and
a connector integral with the air separation module and configured to join the condition monitoring sensor with an electrical system of the aircraft, wherein the connector comprises a lead wire running through the shell.

2. The air separation module of claim 1, wherein the shell comprises aluminum.

3. The air separation module of claim 2, wherein the connector is fitted within a hole machined in the shell.

4. The air separation module of claim 1, wherein the shell comprises a composite.

5. The air separation module of claim 4, wherein the condition monitoring sensor is embedded in the composite.

6. The air separation module of claim 1, wherein the connector is configured to receive an electrical connector of the electrical system.

7. The air separation module of claim 6, wherein the connector and the electrical connector are secured by a fastener.

8. The air separation module of claim 7, wherein the fastener is a quarter-turn fastener or a screw lock.

9. The air separation module of claim 4, wherein the composite is selected from the group consisting of carbon fiber, aramid fiber, and polyethylene fiber.

10. The air separation module of claim 1, wherein the condition monitoring sensor is embedded in the end plug of the air separation membrane.

11. The air separation module of claim 1, wherein the condition monitoring sensor is selected from the group consisting of pressure transducers, temperature sensors, oxygen sensors, and ozone exposure indicators.

12. A method of assembling an air separation module, the method comprising:
 providing a shell;
 placing an air separation membrane within the shell;
 positioning a condition monitoring sensor within the shell such that the condition monitoring sensor is integral with the air separation module, wherein positioning the condition monitoring sensor comprises embedding the condition monitoring sensor within an element selected from a group consisting of the shell and an end plug of the air separation membrane; and
 joining the condition monitoring sensor with an electrical system of an aircraft by running a lead wire through the shell to connect the condition monitoring sensor to the electrical system.

13. The method of claim 12, wherein positioning the condition monitoring sensor with the shell comprises embedding the condition monitoring sensor within the end plug of the air separation membrane.

14. The method of claim 12, wherein positioning the condition monitoring sensor within the shell comprises installing the condition monitoring sensor within an aluminum shell.

15. The method of claim 14, wherein joining the condition monitoring sensor with the electrical system of the aircraft comprises machining a hole in the aluminum shell and fitting a connector within the hole, wherein the lead wire connects to the condition monitoring sensor and an electrical connector of the electrical system of the aircraft via a fastener.

16. The method of claim 12, wherein positioning the condition monitoring sensor within the shell comprises embedding the condition monitoring sensor within a carbon fiber composite.

17. The method of claim 16, wherein joining the condition monitoring sensor with the electrical system of the aircraft comprises embedding the lead wire in layers of the carbon fiber composite.

18. The method of claim 16, wherein joining the condition monitoring sensor with the electrical system of the aircraft comprises embedding a connector or a mounting plate for the connector within the carbon fiber composite, wherein the connector comprises the lead wire connecting the condition monitoring sensor and the electrical system of the aircraft via a fastener.

19. An air separation module comprising:
 a shell configured to house an air separation membrane;
 an inlet configured to receive supply air;
 an oxygen-enriched air outlet configured to exhaust oxygen from the air separation module;
 a nitrogen-enriched air outlet configured to supply a stream of nitrogen-enriched air to a fuel tank of an aircraft;
 a condition monitoring sensor integral with the air separation module and configured to measure at least one of a plurality of conditions, wherein the condition monitoring sensor is embedded in an end plug of the air separation membrane; and
 a connector integral with the air separation module and configured to join the condition monitoring sensor with an electrical system of the aircraft.

* * * * *